United States Patent
Jung et al.

(10) Patent No.: US 10,879,980 B2
(45) Date of Patent: Dec. 29, 2020

(54) BASE STATION AND TERMINAL IN WIRELESS COMMUNICATION SYSTEM, AND CONTROL METHOD THEREFOR

(71) Applicant: Samsung Electronics Co., Ltd., Suwon-si (KR)

(72) Inventors: Doyoung Jung, Suwon-si (KR); Ingil Baek, Suwon-si (KR); Yibin Sun, Suwon-si (KR); Junhee Jeong, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/486,012

(22) PCT Filed: Mar. 14, 2017

(86) PCT No.: PCT/KR2017/002761
§ 371 (c)(1),
(2) Date: Aug. 14, 2019

(87) PCT Pub. No.: WO2018/155758
PCT Pub. Date: Aug. 30, 2018

(65) Prior Publication Data
US 2020/0052754 A1 Feb. 13, 2020

(30) Foreign Application Priority Data
Feb. 21, 2017 (KR) .......... 10-2017-0022946

(51) Int. Cl.
*H04B 7/06* (2006.01)
*H04W 16/28* (2009.01)
*H04W 84/04* (2009.01)

(52) U.S. Cl.
CPC .......... *H04B 7/0617* (2013.01); *H04W 16/28* (2013.01); *H04W 84/042* (2013.01)

(58) Field of Classification Search
CPC .... H04B 7/0617; H04B 7/088; H04B 7/0695; H04B 17/309; H04B 17/20; H04B 7/0408;
(Continued)

(56) References Cited

U.S. PATENT DOCUMENTS

| | | |
|---|---|---|
| 9,125,196 B2 | 9/2015 | Sayana et al. |
| 9,312,985 B2 | 4/2016 | Sanderovich |

(Continued)

FOREIGN PATENT DOCUMENTS

| | | |
|---|---|---|
| KR | 10-2010-0113262 A | 10/2010 |
| KR | 10-2015-0015447 A | 2/2015 |
| WO | 2015/199252 A1 | 12/2015 |

OTHER PUBLICATIONS

Intel Corporation, "Reference Signal and Procedure for UE Beam Refinement (BM P-3)", 3GPP Draft, R1-1609514 Reference Signal and Procedure for UE Beam Refinement R1, 3rd Generation Partnership Project (3GPP), Mobile Competence Centre, 650, Route Des Lucioles, F-06921 Sophia-Antipoli vol. RAN WG1, No. Lisbon, Portugal, Oct. 10, 2016-Oct. 14, 2016, Oct. 1, 2016, XP051159584.

(Continued)

*Primary Examiner* — Dac V Ha
(74) *Attorney, Agent, or Firm* — Jefferson IP Law, LLP

(57) ABSTRACT

This disclosure relates to a 5G or pre-5G communication system to support higher data transmission rate than a 4G communication system such as LTE. A method for controlling a terminal in a wireless communication system according to one embodiment of the present invention comprises: a step of performing beam training; and a first determining step of determining whether to stop a trigger for the beam training according to the result of performing the beam training, on the basis of whether or not a beam having a maximum channel gain is changed. This research was car- (Continued)

ried out with the support of the "Cross-Ministry Giga Korea Project" of the Korean Government Ministry of Science, ICT and Future Planning.

15 Claims, 17 Drawing Sheets

(58) Field of Classification Search
CPC .. H04W 16/28; H04W 84/042; H04L 1/0009; H04L 1/0003; H04L 1/002
See application file for complete search history.

(56) References Cited

U.S. PATENT DOCUMENTS

| | | | |
|---|---|---|---|
| 2009/0067539 A1 | 3/2009 | Maltsev et al. | |
| 2010/0261498 A1 | 10/2010 | Ko et al. | |
| 2012/0287797 A1 | 11/2012 | Basson et al. | |
| 2013/0286960 A1 | 10/2013 | Li et al. | |
| 2015/0289147 A1* | 10/2015 | Lou | H04B 7/0413 370/329 |
| 2016/0127078 A1 | 5/2016 | Yang et al. | |
| 2017/0149479 A1 | 5/2017 | Kim et al. | |
| 2018/0034611 A1* | 2/2018 | Nagaraja | H04L 5/0048 |
| 2018/0191418 A1* | 7/2018 | Xia | H04B 7/088 |
| 2019/0341989 A1* | 11/2019 | Raghavan | H04B 17/391 |

OTHER PUBLICATIONS

Nokia et al., "Reference symbols supporting CSI acquisition framework", 3GPP Draft; R1-1610269, 3rd Generation Partnership Project (3GPP), Mobile Competence Centre, 650, Route Des Lucioles, F-06921 Sophia-Antipolis Cedex; France vol. RAN WG1, No. Lisbon, Portugal, Oct. 10, 2016-Oct. 14, 2016, Sep. 30, 2016, XP051158908.

Kim Joongheon et al., "Fast millimeter-wave beam training with receive beamforming", Journal of Communications and Networks, New York, NY, USA, IEEE, US, vol. 16, No. 5, Oct. 1, 2014, pp. 512-522, XP01156435.

Huawei et al., "Discussion on downlink beam measurement and UE reporting procedure", 3GPP Draft, R1-1701714, 3rd Generation Partnership Project (3GPP), Mobile Competence Centre, 650, Route Des Lucioles, F-06921 Sophia-Antipolis Cedex, France vol. RAN WG1, No. Athens, Greece; Feb. 13, 2017-Feb. 17, 2017, Feb. 6, 2017, XP051220579.

European Search Report dated Dec. 20, 2019, issued in European Patent Application No. 17898198.1.

* cited by examiner

BASE STATION AND TERMINAL IN WIRELESS COMMUNICATION SYSTEM, AND CONTROL METHOD THEREFOR

TECHNICAL FIELD

The disclosure relates to a wireless communication system and, in particular, to a beam training control method of a base station and a terminal in a channel degradation situation.

This research was conducted with support from the "Government-wide Giga KOREA project" led by the Ministry of Science, ICT, and Future Planning.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, there is a need of a method for a base station and a terminal to efficiently perform beam training or link adaptation even in a situation where a channel degradation occurs between the base station and terminal.

DISCLOSURE OF INVENTION

Technical Problem

In order to satisfy such a need, the disclosure proposes a method for at least one of a base station and a terminal to efficiently perform beam training or link adaptation in a degraded channel condition.

Solution to Problem

According to an embodiment of the disclosure, a control method of a terminal in a wireless communication system includes performing beam training and making a first determination on whether to suspend triggering beam training based on whether a beam with a best channel gain is changed according to an execution result of the beam training.

According to another embodiment of the disclosure, a terminal in a wireless communication system includes a controller configured to control to perform beam training and determine whether to suspend triggering beam training based on whether a beam with a best channel gain is changed according to an execution result of the beam training.

According to another embodiment of the disclosure, a control method of a base station in a wireless communication system includes performing beam training and making a first determination on whether to suspend triggering beam training based on whether a beam with a best channel gain is changed according to an execution result of the beam training.

According to another embodiment of the disclosure, a base station in a wireless communication system includes a controller configured to control to perform beam training and determine whether to suspend triggering beam training based on whether a beam with a best channel gain is changed according to an execution result of the beam training.

Advantageous Effects of Invention

The method of the disclosed embodiments is advantageous in terms of allowing a terminal and a base station to control a condition for performing beam training or link adaptation in a channel status-adaptative manner. The method of the disclosed embodiments is also advantageous in terms of preventing a terminal and a base station from performing unnecessary aperiodic beam training and link adaptation.

MODE FOR THE INVENTION

Figure 1:
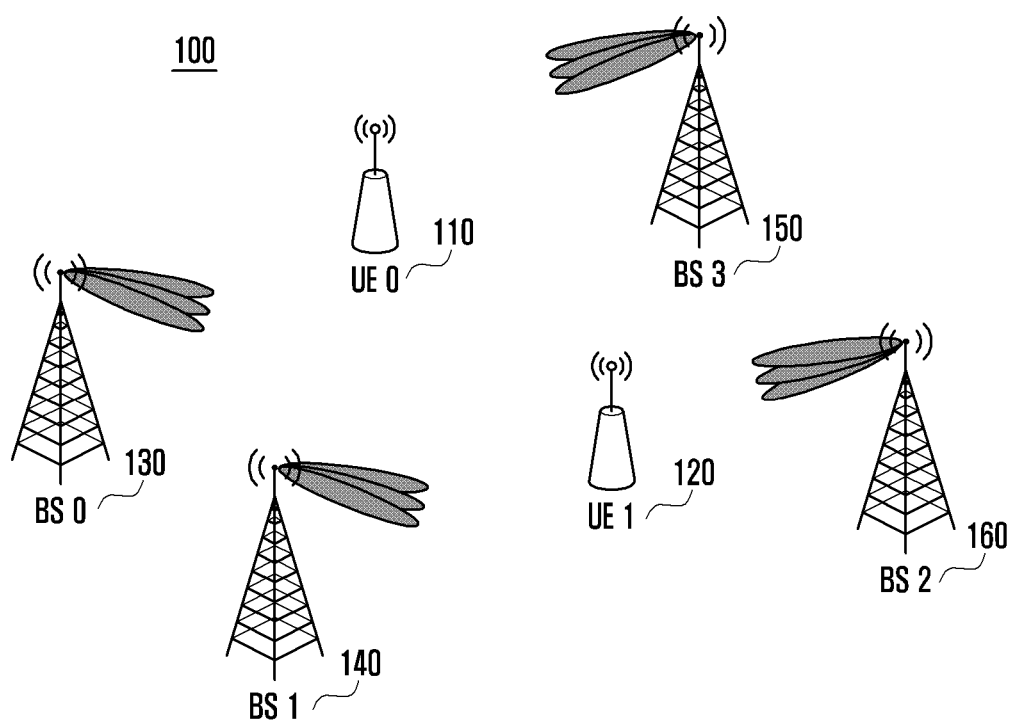
FIG. 1 is a diagram illustrating a typical 5G communication system.

Exemplary embodiments of the disclosure are described in detail with reference to the accompanying drawings.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

In the disclosure, the term "terminal" is used to refer to a mobile terminal and a device subscribed to a mobile communication system for receiving a service from the mobile communication system. Examples of the mobile terminal may include but are not limited to a smart device such as a smartphone and a tablet PC in an embodiment of the disclosure.

FIG. 1 is a diagram illustrating a typical 5G communication system 100. In order to provide user terminals 110 and 120 with stable mobile communication services, it may be necessary to deploy multiple 5G base stations 130 to 160. The 5G communication system 100 may be designed based on beam coverages of the antennas of the base stations 130 to 160 and radiated powers of the antennas such as equivalent isotropic radiated power (EIRP).

In a communication system such as the 5G communication system 100, if a channel condition between a transmitting end and a receiving end is degraded, beam training is performed to search for a new link and measure a channel condition per-beam pair between the transmitting end and the receiving end. It may also be possible to perform link adaptation on the channel with the degraded condition.

The beam training may be performed in such a way of measuring a channel condition per beam pair between the transmitting and receiving ends while sweeping the beams of the transmitting and receiving ends. For example, it may be possible to measure a channel condition per beam pair in the state where the transmit beam of a base station is fixed while the receive beam corresponding to the transmit beam of a terminal is sweeping.

Figure 2:
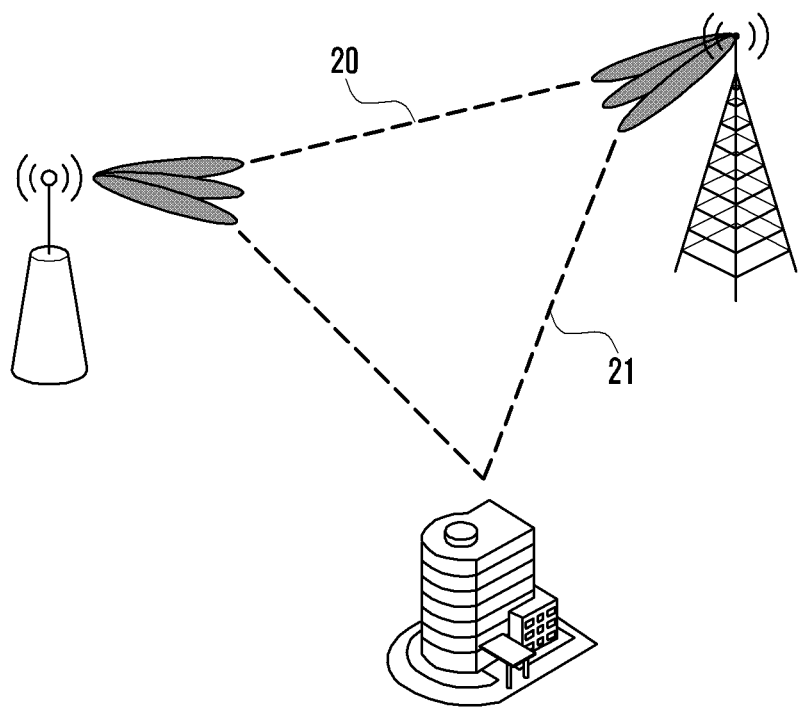
FIG. 2 is a diagram illustrating a typical beam training operation.

FIG. 2 is a diagram illustrating a beam training operation. A base station 200 and a terminal 210 may measure a channel condition per beam pair between a transmitting end and receiving end through beam training. Here, a path between a beam of the transmitting end and a beam of the receiving beam may be defined as a link for performing radio communication.

The base station 200 and the UE 210 may select a beam pair suitable for radio communication based on the measured channel condition. For example, the terminal may select a beam pair with the best channel gain between the transmitting and receiving ends as beams for use in communication. The terminal may transmit information on the beam pair with the best channel gain to the base station. In the following description, the beam pair with the best channel gain between the transmitting and receiving ends is referred to as "best beam".

As shown in FIG. 2, if a first link 20 is determined as the best beam based on a result of the beam training, the base station 200 and the terminal 210 may perform radio communication through the first link 20.

If a beam training period arrives or if an event triggering aperiodic beam training or channel degradation is detected, the base station 200 and the terminal 210 may perform beam training and select a second link 21 as the best beam based on a result of the beam training.

Meanwhile, link adaptation may mean determining a best data rate or transmit power between a transmitting end and a receiving end. For example, link adaptation may mean determining a modulation and coding scheme (MCS) based on a channel condition between a terminal and a base station.

FIGS. 3A to 3D are signal flow diagrams illustrating link adaptation methods.

Figure 3A:
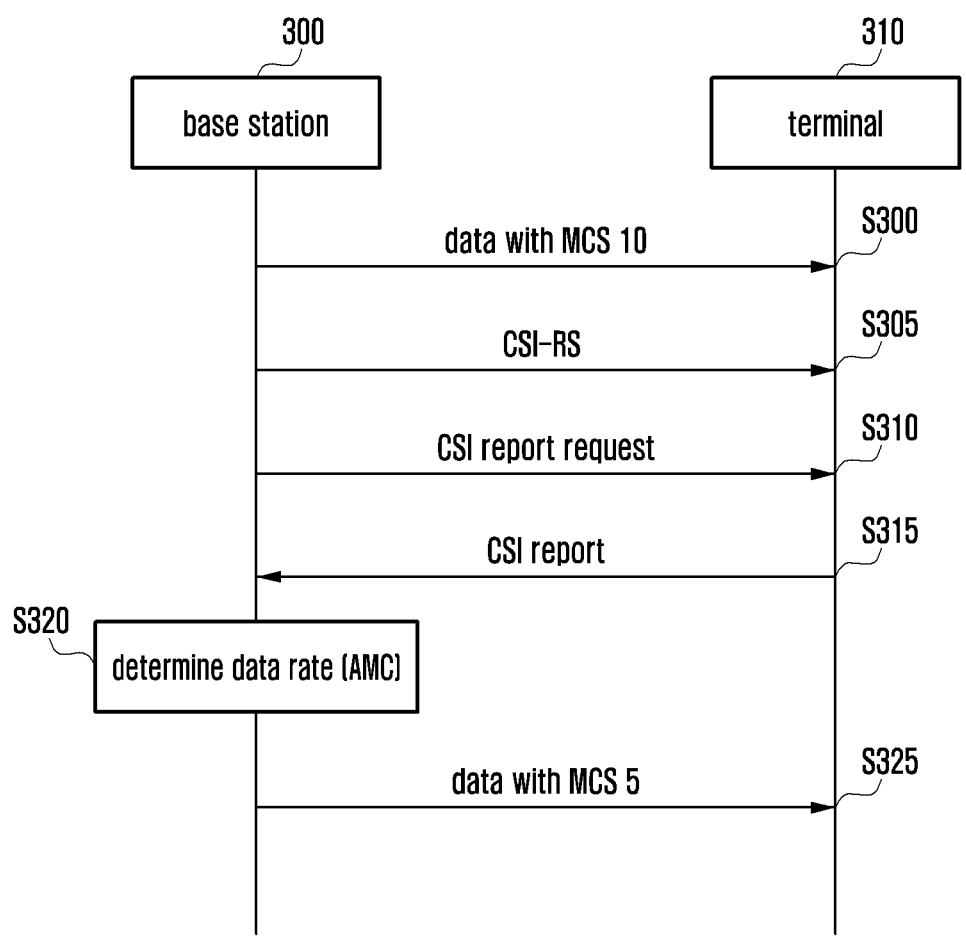
FIGS. 3A to 3D are signal flow diagrams illustrating methods of performing a typical link adaptation operation.

FIG. 3A is a signal flow diagram illustrating a downlink data rate control-based link adaptation method. At step S300, a base station 300 may transmit data to a terminal 310 based on an arbitrary data rate. For example, as shown in FIG. 3A, the base station 300 may transmit the data with MCS 10 based on a channel condition.

At step S305, the base station 300 may transmit a channel state information reference signal (CSI-RS) to the terminal 310. The CSI-RS is a reference signal being transmitted for use by at least one terminal located within a cell for measuring a channel condition.

The base station 300 may also transmit a common reference signal (CRS) to the terminal 310. The CRS may be a reference signal being broadcast for all terminals located within a cell.

At step S310, the base station 300 may request to the terminal 310 for a CSI report. For example, the base station 300 may request to the terminal 310 for the CSI report using DCI.

The UE 310 may generate feedback information based on the received CSI-RS and, at step S315, transmit a CSI report to the base station 300. The CSI report transmitted from the UE 310 to the base station 300 may include a channel quality indicator (CQI), a precoding matrix indicator (PMI), and a rank indicator (RI).

At step S320, the base station 300 may perform adaptative modulation and coding (AMC). According to an embodiment, the base station 300 may change an MCS level based on the received CSI report.

For example, the base station 300 may adjust the MCS level from 10 to 5 based on the CSI report. At step S325, the base station 300 may transmit data at the adjusted MCS level of 5.

Figure 3B:
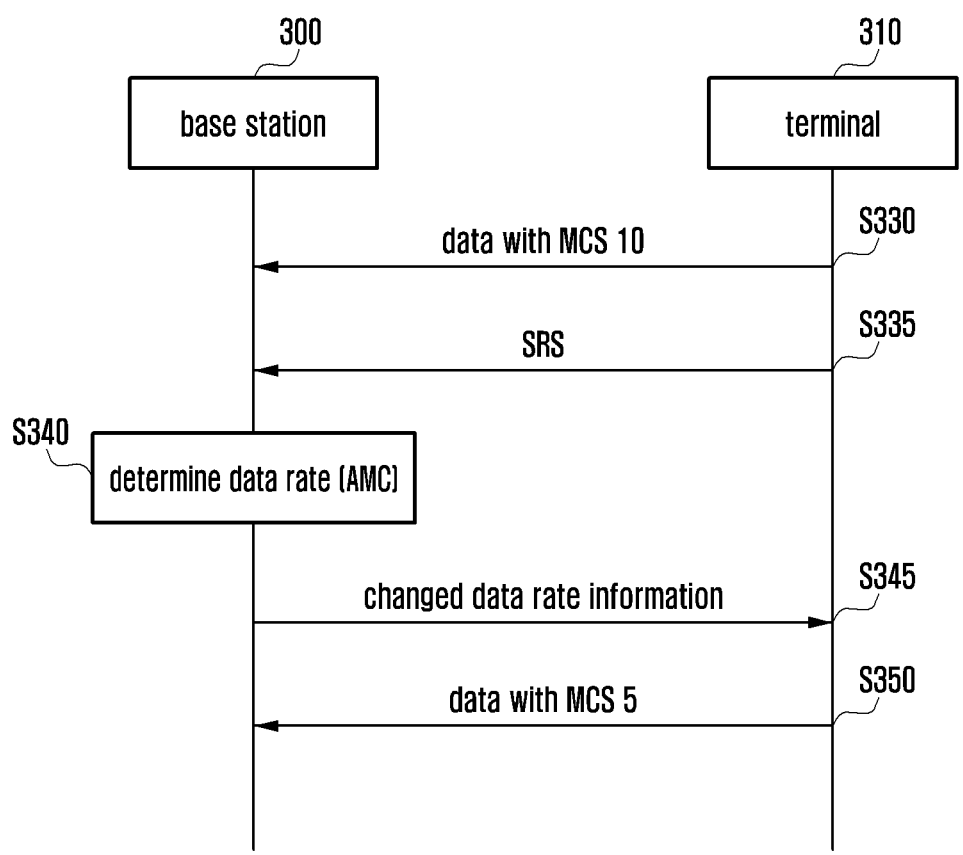

Meanwhile, as shown in FIG. 3B, it may also be possible to perform link adaptation by controlling an uplink data rate.

For example, at step S330, a terminal 310 may transmit uplink data with MCS 10. At step S335, the terminal 310 may transmit a sounding reference signal (SRS) to the base station 300. The SRS is used for estimating an uplink channel quality; the base station 300 may perform channel-dependent (i.e., frequency-selective) uplink scheduling based on the SRS.

At step S340, the base station 300 may perform AMC. For example, the base station may adjust an MCS level based on the received SRS.

At step S345, the base station 300 may transmit information on the adjusted data rate to the terminal 310. For example, if the adjusted data rate corresponds to MCS 5, the terminal 310 may transmit uplink data with MCS 5 at step S350.

Figure 3C:
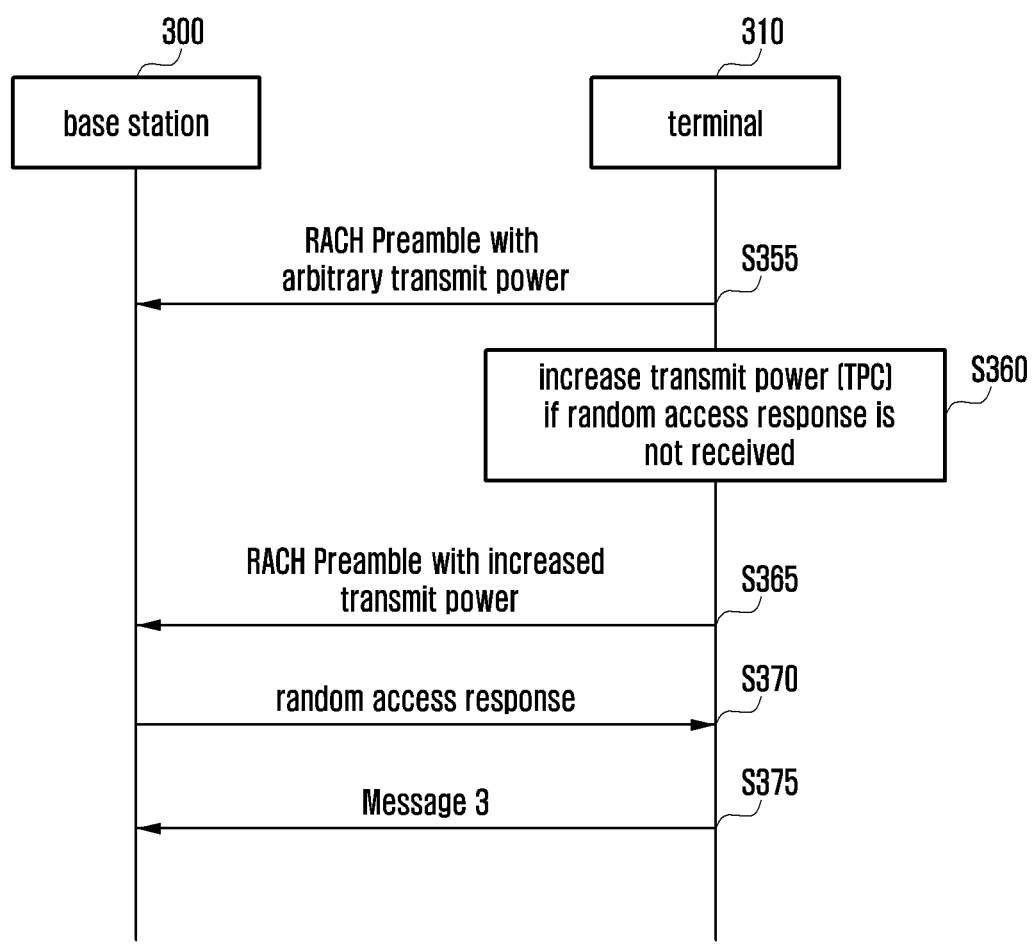

Meanwhile, FIG. 3C is a signal flow diagram illustrating a transmit power control-based link adaptation method. For example, if a terminal 310 powers on, the terminal 310 may perform random access.

At step S355, the terminal may transmit a random access preamble to a base station 300 through a random access channel (RACH). Here, the terminal 310 may transmit the random access preamble with an arbitrary transmit power.

If the random access of the terminal 310 to the base station succeeds, the base station 300 may transmit a random access response (RAR) message to the terminal 310.

At step S360, the terminal 310 may perform transmit power control (TPC). In detail, if no RAR is received, the terminal 310 may control to increase the transmit power for transmitting the random access preamble.

At step S365, the terminal 310 may transmit an RACH preamble with the increased transmit power.

If the random access succeeds, the base station 300 may transmit an RAR to the terminal 310 at step S370. The RAR transmitted by the base station 300 may include scheduling information.

After the random access succeeds, the terminal 310 may transmit Message 3 at step S375 to request for an RRC connection.

Figure 3D:
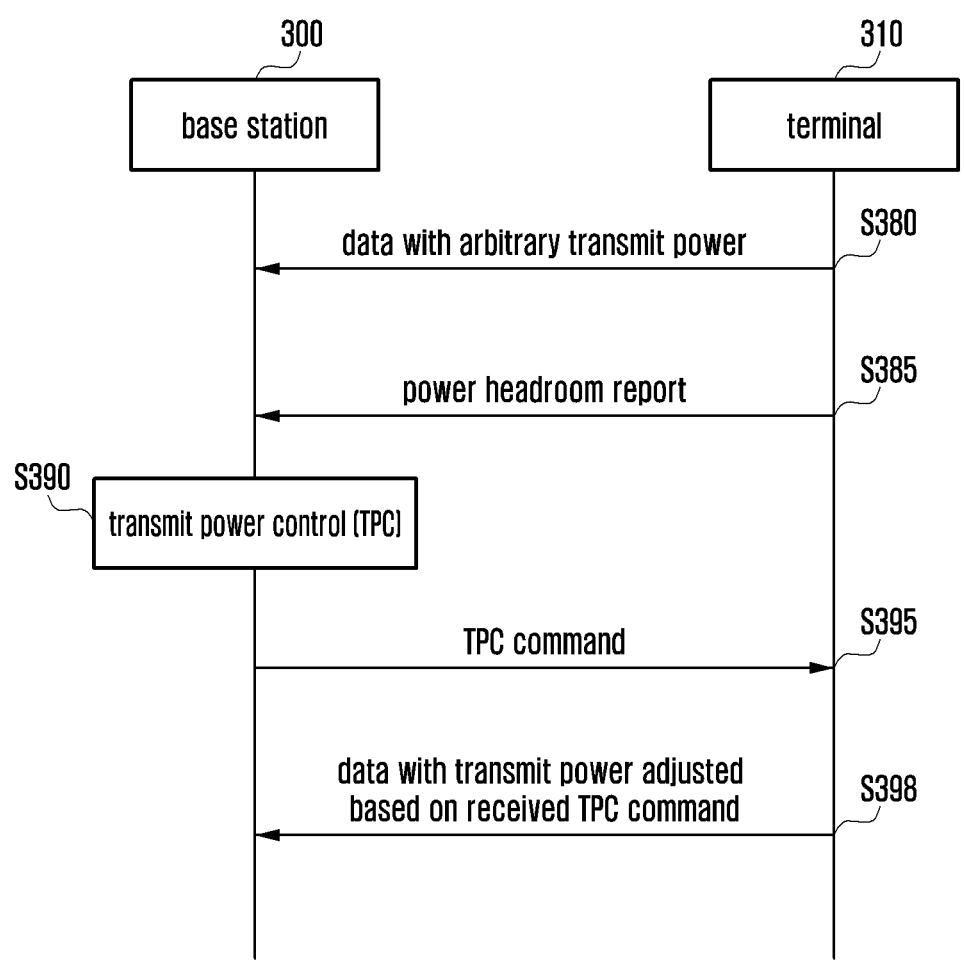

FIG. 3D is a signal flow diagram illustrating a transmit power control-based link adaptation method of a base station 300.

At step S380, a terminal 310 may transmit data to a base station 300 with an arbitrary transmit power. At step S385, the terminal 310 may transmit a power headroom report (PHR).

At step S390, the base station 300 may perform TCP based on the received PHR. At step S395, the base station 300 may transmit a TPC command. For example, the base station 300 may transmit the TPC command to the terminal 310 using DCI.

At step S398, the terminal 310 may transmit data with the transmit power adjusted based on the received TPC command.

However, it has not been clearly standardized whether to perform first the beam training as described with reference to FIG. 2 or the link adaptation described with reference to FIGS. 3A to 3D when channel degradation occurs.

For example, in the case where beam training is followed by link adaptation, if a beam selected based on a result of the beam training is not the best beam, it may fail to overcome the channel degradation because the link adaptation is not carried out on the best beam. Furthermore, even though the beam selected based on the result of the beam training is the best beam, extra beam training may be unnecessarily performed.

Figure 4A:
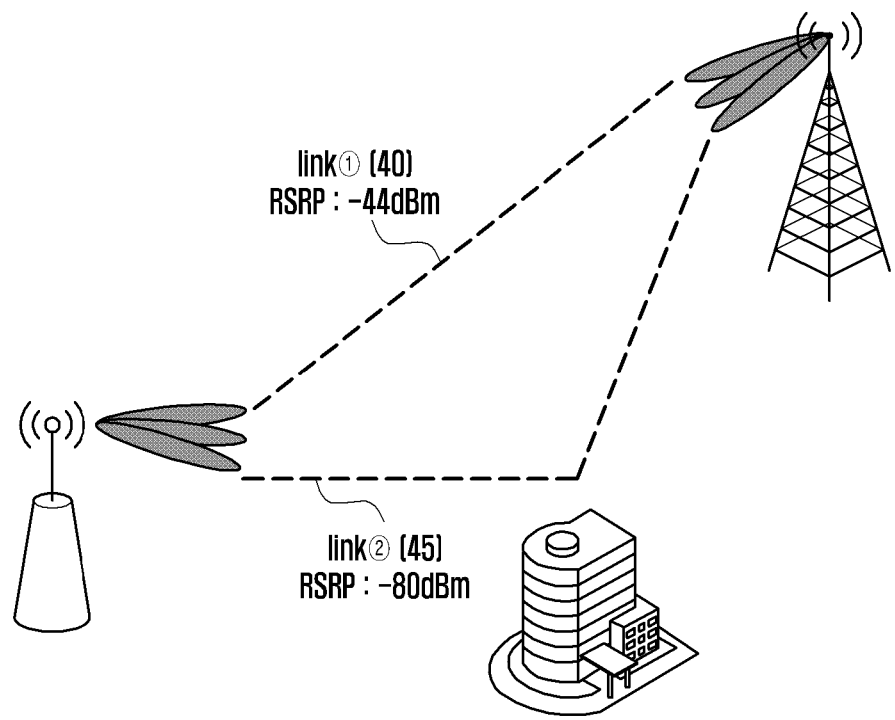
FIGS. 4A and 4B are diagrams illustrating a situation necessary to perform link adaptation preferentially according to an embodiment of the disclosure.
Figure 4B:
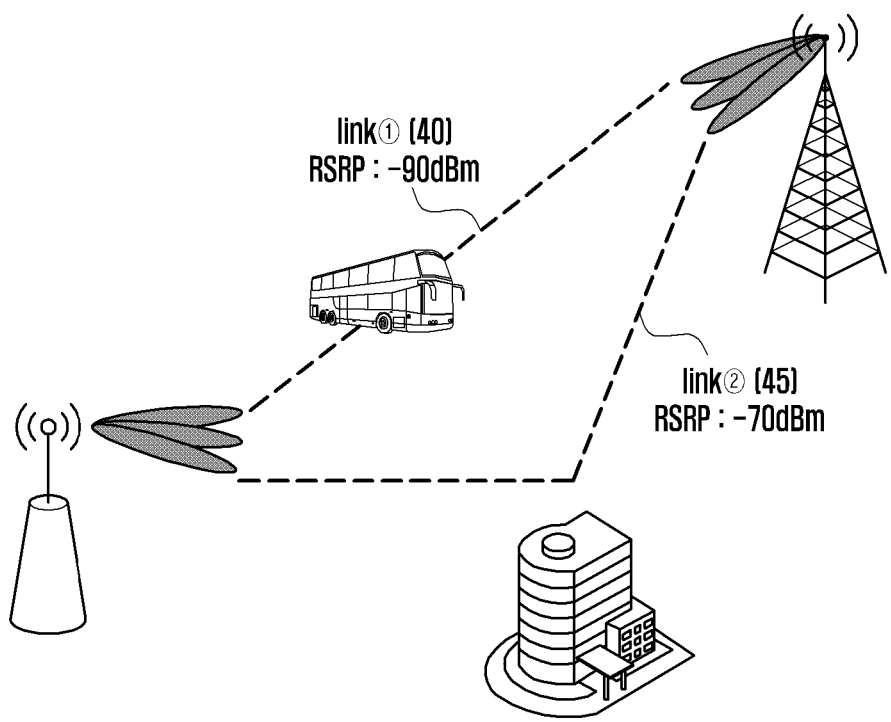

FIGS. 4A and 4B are diagrams for explaining an exemplary case where link adaptation is performed when the selected beam is actually not the best beam.

As shown in FIG. 4A, a terminal and a base station may determine a first link 40 and a second link 45 as good links with satisfactory channel gains based on a beam training result. For example, a reference signal received power (RSRP) of the first link 40 may be −40 dBm, and the RSRP of the second link 41 may be −80 dBm.

In this case, the terminal and the base station may select the first link 40 as the best beam.

As shown in FIG. 4B, if the first link 40 is blocked by a temporary obstacle, this may cause temporary channel degradation, resulting in a decrease of the RSRP of the first link 40. In this case, if the decrease of the RSRP of the first link 40 triggers beam training immediately, the terminal and the base station may perform beam training and select the second link 41 as the best beam based on a result of the beam training.

However, if the temporary obstacle disappears, the first link 40 may again be the beam with the best channel gain. This means that the terminal and the base station might have unnecessarily performed the beam training and selected a link with non-best channel gain as the best beam.

In this case, if the terminal and the base station perform link adaptation on the second link 45, the channel degradation may not be overcome because the beam on which the link adaptation is performed is not the best beam.

Figure 5A:
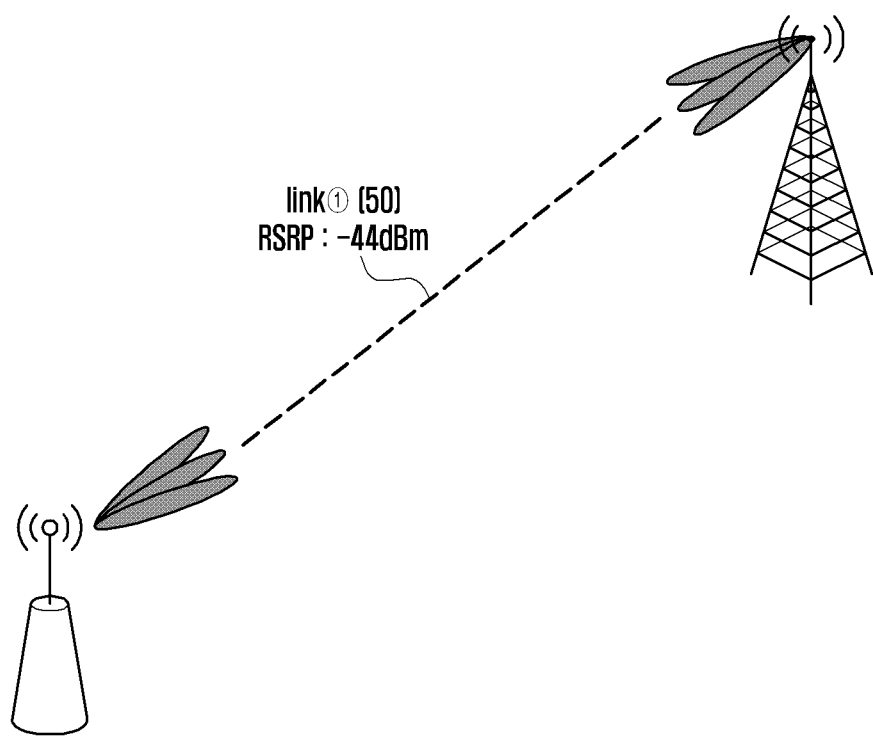
FIGS. 5A and 5B are diagrams illustrating a situation necessary to perform beam training preferentially according to an embodiment of the disclosure.
Figure 5B:
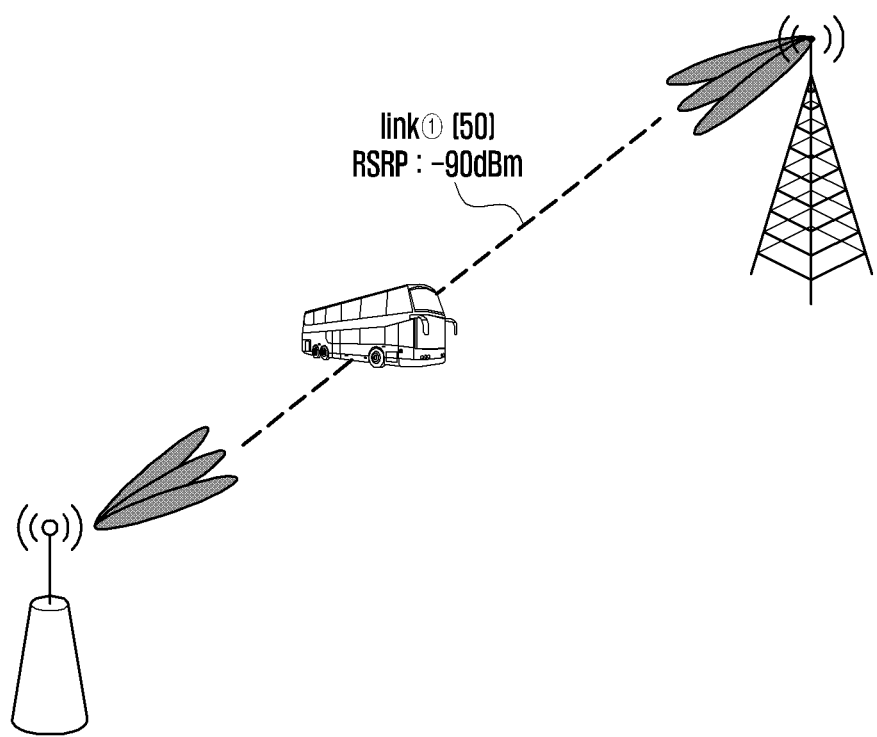

FIGS. 5A and 5B are diagrams for explaining an exemplary case where extra beam training is unnecessarily performed even though the best beam is selected as a result of beam training.

FIG. 5A depicts an exemplary case where only a first link 50 is determined as a beam with a good channel gain based on a result of beam training. In this case, the terminal and the base station may select the first link 50 as the best beam based on the beam training result.

As shown in FIG. 5B, if the first link 50 is temporarily blocked by an obstacle, the RSRP of the first link 50 may decrease. If the RARP decreases, this may mean occurrence of channel degradation.

Accordingly, it is impossible to determine a beam with a good channel gain even though extra beam training is performed. In this case, if the decrease of the RSRP of the first link 50 triggers beam training immediately, even though the terminal and the base station perform beam training, the first link 50 is still likely to be selected as the best beam. This means that the terminal and the base station may unnecessarily perform beam training.

Hereinafter, a description is made of the method for determining an operation to be performed preferentially between beam training and link adaptation operations and performing the selected operation so as to efficiently overcome a channel degradation.

Figure 6:
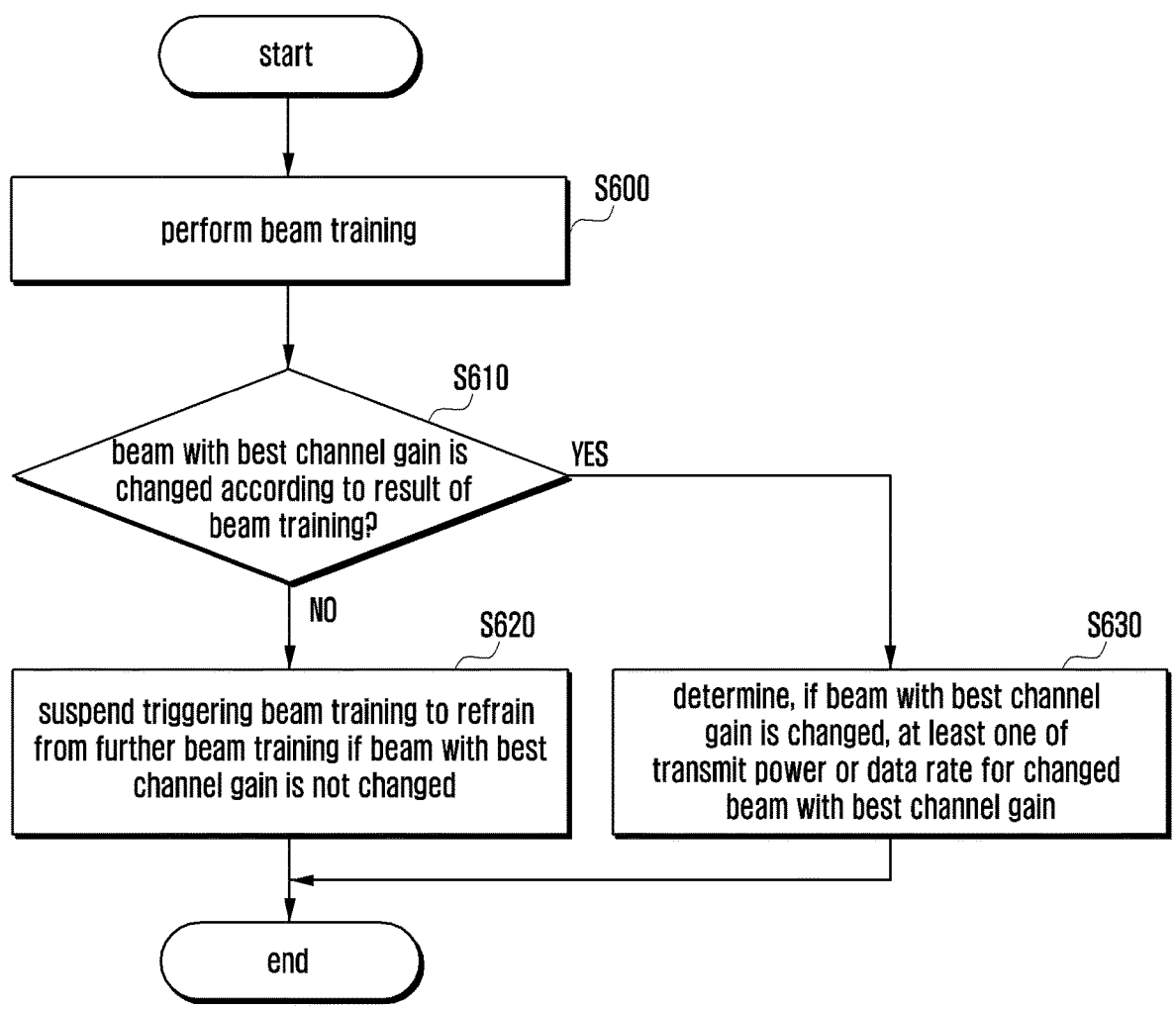
FIG. 6 is a flowchart illustrating a control method according to an embodiment of the disclosure.

FIG. 6 is a flowchart illustrating a control method of a terminal and a base station according to an embodiment of the disclosure.

At step S600, the terminal and the base station may perform beam training. The beam training may mean measuring a channel condition per beam pair while sweeping beams of the terminal and the base station. For example, it may be possible to measure a channel condition per beam pair in the state where the transmit beam of a base station is fixed while the receive beam corresponding to the transmit beam of a terminal is sweeping.

Beam training may be triggered periodically or aperiodically. Channel degradation may trigger beam training aperiodically. Beam training may be aperiodically triggered by the terminal or the base station.

At step S610, it may be possible to determine whether a beam with the best channel gain is changed based on a result of the beam training. For example, the terminal may determine whether a best beam is changed, the best beam being determined based on a result of beam training. The terminal may transmit to the base station the result on whether the best beam is changed. For example, only when the best beam is changed, the terminal may transmit the information on the changed best beam to the base station.

If it is determined that the beam with the best channel gain is not changed, it may be possible to suspend, at step S620, triggering beam training and refrain from performing further beam training. For example, the terminal and the base station may each suspend triggering aperiodic beam training. In the following description, the suspension of triggering aperiodic beam training is referred to as beam lock.

If it is determined that the beam with the beast channel gain is changed, it may be possible to determine, at step S630, at least one of a transmit power or a data rate of the beam with the best channel gain. In detail, the terminal and the base station may perform link adaptation.

For example, the base station may adjust a frequency of triggering a terminal to report CSI; the CSI report of the terminal being triggered using a CSI-RS request field included in DCI. Accordingly, the base station may increase a number of times of triggering a CSI-RS report of the terminal to determine at least one of the transmit power or the data rate on the changed beam with the best channel gain.

Hereinafter, a description is made of the control method of a terminal and a base station according to an embodiment of the disclosure with reference to FIG. 7.

Figure 7:
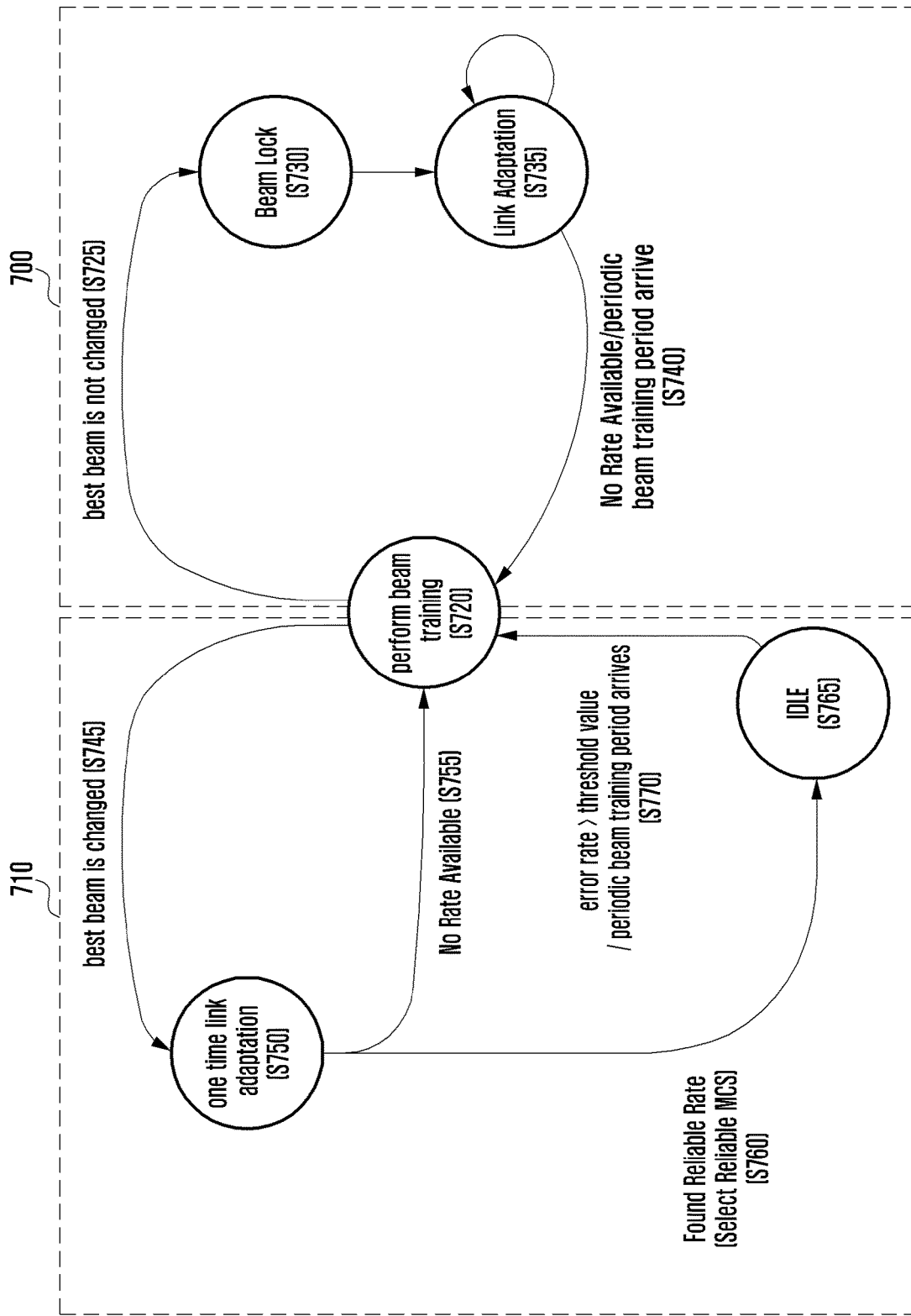
FIG. 7 is a diagram for explaining a control method according to an embodiment of the disclosure.

In FIG. 7, reference number 700 denotes a process for the case where the best beam is not changed based on a result of beam training, and the process may be referred to as a link adaptation-preferential process.

Reference number 710 denotes a process for the case where the best beam is changed based on a result of beam training, and the process may be referred to as a beam training-preferential process.

At step S720, the terminal and the base station may perform beam training. For example, if channel degradation occurs, at least one of the terminal or the base station may trigger aperiodic beam training. As a consequence, the terminal and the base station may measure a channel condition per beam pair while sweeping their beams.

It may be possible to determine a beam with the best channel gain, i.e., best beam, based on a result of the beam training. If the newly selected best beam is identical with the old best beam used previously for radio communication, i.e., if the best beam is not changed after performing the beam training, at step S725, this may trigger the link adaptation-preferential process 700.

In the link adaptation-preferential process 700, the terminal and the base station may suspend triggering of beam training at step S730 to refrain from performing further beam training. For example, the terminal and the base station may each suspend triggering of aperiodic beam training. In the following description, the suspension of triggering aperiodic beam training is referred to as beam lock.

In the beam lock state, the terminal and the base station may perform link adaptation on the unchanged best beam as denoted by reference number S735. For example, the terminal and the base station may determine at least one of a transmit power or a data rate on the best beam.

In detail, the base station may adjust a frequency of triggering a terminal to report CSI; the CSI report of the terminal being triggered using a CSI-RS request field included in the DCI. Accordingly, the base station may, for the changed beam, increase a number of times of triggering a CSI-RS report of the terminal to determine at least one of the transmit power or the data rate on the beam with the best channel gain.

The terminal may measure a channel condition based on the trigger of the CSI-RS report of the base station and transmit a CSI-RS report to the base station.

The terminal and the base station may perform link adaptation repetitively until a predetermined event is detected at step S740. The predetermined event may be arrival of a beam training period or failure to detect an available data rate (no data available).

In detail, the beam lock state may be a state in which neither the terminal nor the base station triggers aperiodic beam training. If a beam training period arrives, the terminal and the base station may stop the link adaptation operation and resume the beam training.

If it fails to detect an available data rate, this may be the case where no MCS level appropriate for the best beam is identified.

For example, it may occur that communication is still impossible even though the lowest MCS level is selected for communication through the best beam as the MCS level adjusted based on the link adaptation performed by the base station.

It may also occur that an arbitrarily requested service requires an MCS level higher than a predetermined level for use of the best beam. For example, a streaming service requested by a terminal may require a relatively high MCS level. In this case, if there is no MCS level sufficient to provide the streaming service even after the base station adjusts the MCS level for providing the streaming service through the best beam, it is determined that there is no available data rate.

If it is determined at step S740 that a predetermined event has occurred, beam training may be performed at step S720.

If the beam with the best channel gain, i.e., the best beam, is changed at step S745 as a result of an execution of beam training, this may trigger the beam training-preferential process 710.

In detail, if the beam with the best channel gain is changed as a result of an execution of beam training, the terminal and the base station may determine a transmit power and a data rate on the changed beam with the best channel gain. For example, the terminal and the base station may perform link adaptation at one time on the changed best beam at step S750.

If it is determined at step S755 that there is no data rate available for the best beam as a result of the single execution of link adaptation, beam training may be performed again. For example, at least one of the terminal or the base station may trigger aperiodic beam training.

If a data rate available for the changed best beam is determined at step S760 as a result of the single execution of link adaptation, the terminal and the base station may perform radio communication, at step S765, with the determined data rate using the best beam.

At step S765, if an error rate becomes equal to or greater than a threshold value or if a beam training period arrives at step S770 during the radio communication, the terminal and the base station may perform beam training again.

For example, if the terminal transmits nack signals more than a predetermined number to the base station during a predetermined time period, this may determine that the error rate is greater than the threshold value. As described above, if a beam training execution period arrives, the terminal and the base station may perform beam training again.

Figure 8:
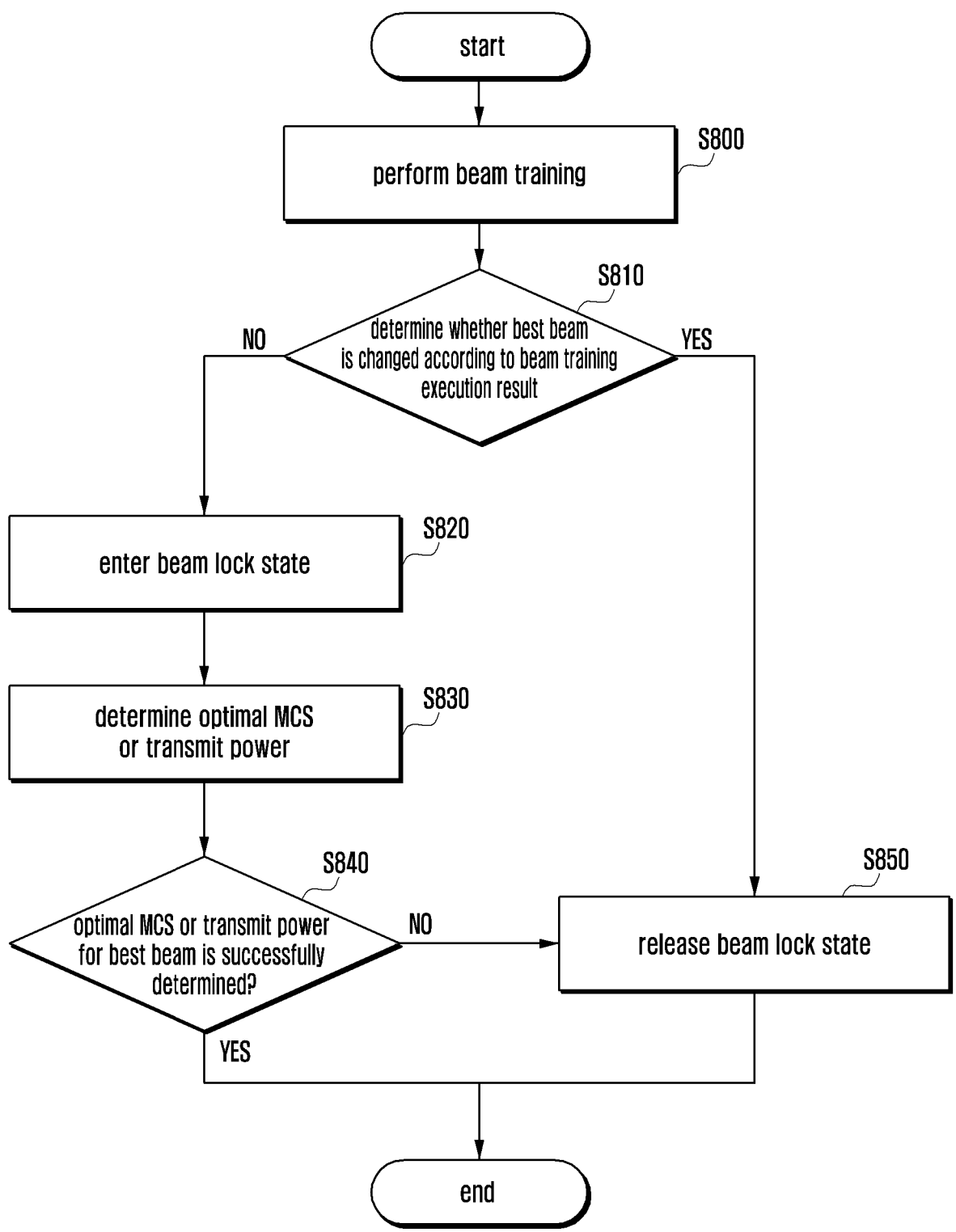
FIG. 8 is a flowchart illustrating operations of a terminal and a base station in a beam lock state according to an embodiment of the disclosure.

FIG. 8 is a flowchart illustrating operations of a terminal and a base station in a beam lock state according to an embodiment of the disclosure.

At step S800, the terminal and the base station may perform beam training. The beam training may mean measuring a channel condition per beam pair while sweeping beams of the terminal and the base station. For example, it may be possible to measure a channel condition per beam pair in the state where the transmit beam of a base station is fixed while the receive beam corresponding to the transmit beam of a terminal is sweeping.

Beam training may be triggered periodically or aperiodically. Channel degradation may trigger beam training aperiodically. Beam training may be aperiodically triggered by the terminal or the base station.

At step S810, it may be possible to determine whether a beam with the best channel gain is changed based on a result of the beam training. The terminal may determine whether a best beam is changed, the best beam being determined based on a result of beam training. The terminal may transmit the result on whether the best beam is changed. For example, only when the best beam is changed, the terminal transmit the information on the changed best beam to the base station.

For example, the terminal and the base station may perform beam training, and at least one of the terminal or the base station may acquire information on a pair of a beam of the terminal and a beam of the base station, the information being acquired based on the result of the beam training. The terminal and the base station may compare the beam pair information obtained based on the result of a previously executed beam training and the beam pair information obtained based on the result of a re-executed beam training to determine whether the best beam is changed. The execution results of the beam trainings may be shared between the terminal and the base station. For example, the terminal may transmit index information on the best beam selected based on the result of beam training to the base station.

If it is determined that the beam with the best channel gain (best beam) is not changed, it may be possible to enter the beam lock state at step S820.

In the beam lock state, the terminal or the base station may determine a optimal MCS or a transmit power at step S830. As described above, if the terminal transmits a CSI-RS report as triggered by the base station, the base station may determine the optimal MCS based on the CSI-RS report. The terminal may also determine a transmit power suitable for the best beam.

At step S840, it may be possible to determine whether the optimal MCS or transmit power for the best beam has been successfully selected.

If it is determined that the optimal MCS or transmit power for the best beam has been successfully selected, the terminal and the base station may perform radio communication based on the optimal MCS or transmit power using the best beam.

If it is determined that the optimal MCS or transmit power for the best beam has not been selected, it may be possible to release the beam lock state at step S850. For example, at least one of the terminal or the base station may trigger aperiodic beam training.

If it is determined at step S810 that the beam with the best channel gain is changed according to the result of the beam training, a non-beam lock state may be maintained. In this case, at least one of the terminal or the base station may still trigger aperiodic beam training.

Figure 9:
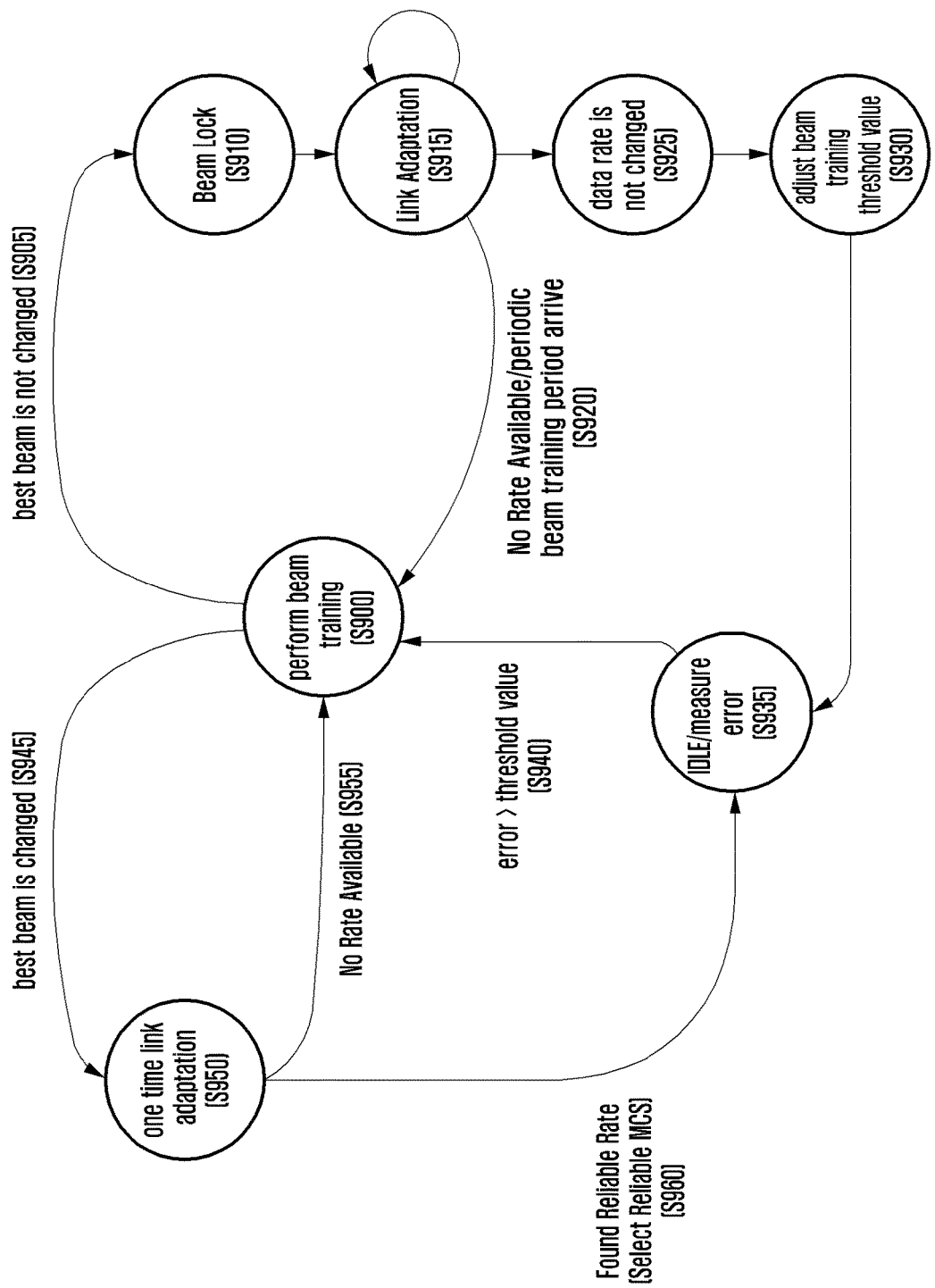
FIG. 9 is a diagram for explaining a control method according to another embodiment of the disclosure.

FIG. 9 is a diagram for explaining a control method of a terminal according to another embodiment of the disclosure. In detail, FIG. 8 depicts a method of learning beam training-trigger conditions adaptatively.

At step S900, the terminal and the base station may perform beam training. For example, if channel degradation occurs, at least one of the terminal or the base station may trigger aperiodic beam training. As a consequence, the terminal and the base station may measure a channel condition per beam pair while sweeping their beams.

It may be possible to determine a beam with the best channel gain, i.e., best beam, based on a result of the beam training. If the newly selected best beam is identical with the old best beam used previously for radio communication, i.e., if the best beam is not changed after performing the beam training, at step S905, the terminal and the base station may refrain from triggering beam training so as not to perform extra beam training. For example, the terminal and the base station may each stop triggering aperiodic beam triggering. That is, it may be possible to enter the beam lock state.

In the beam lock state, the terminal and the base station may perform link adaptation on the unchanged best beam as denoted by reference number S915. For example, the terminal and the base station may determine at least one of a transmit power or a data rate on the best beam.

In detail, the base station may adjust a frequency of triggering a terminal to report CSI; the CSI report of the terminal being triggered using a CSI-RS request field included in DCI. Accordingly, the base station, for the changed beam, may increase a number of times of triggering a CSI-RS report of the terminal to determine at least one of the transmit power or the data rate on the beam with the best channel gain.

The terminal may measure a channel condition based on the trigger of the CSI-RS report of the base station and transmit a CSI-RS report to the base station.

The terminal and the base station may perform link adaptation repetitively at step S915 until a predetermined event is detected. The predetermined event may be arrival of a beam training period or failure to detect an available data rate (no data available).

In detail, the beam lock state may be a state in which neither the terminal nor the base station triggers aperiodic beam training. If a beam training period arrives, the terminal and the base station may stop the link adaptation operation and resume the beam training.

If it is determined that there is no available data rate (no rate available) for the best beam, at least one of the terminal or the base station may trigger beam training.

It may occur at step S925 that the data rate is not changed through the link adaptation on the unchanged best beam at step S915. For example, if the data rate determined through the link adaptation on the best beam is the best data rate for the link, the same data rate is likely to be selected even though link adaptation is performed repetitively.

In this case, it may be possible to adjust, at step S930, a threshold value for beam training. Let's suppose an average block error rate (BLER) of 5%, an error burstiness of 100 TBs, a BLER threshold set to 10%, and a BLER calculation window set to 50 TBs.

In the case where the same data rate is selected through link adaptation, the above settings may be controlled to be reinforced. For example, it may be possible to control such that the BLER threshold is set to 10% and the BLER calculation window is set to 200 TBs.

Such beam training threshold values may be adjusted by at least one of the terminal or the base station. In the case where the terminal adjusts the beam training threshold values, the adjusted beam training threshold values may be transmitted to the base station. Likewise, in the case where the base station adjusts the beam training threshold values, the adjusted beam training threshold values may be transmitted to the terminal.

At step S935, the terminal and the base station may perform radio communication using the best beam. The terminal and the base station may also measure an error rate.

As a result of the measurement, if the error rate is greater than the threshold value, the terminal and the base station may perform beam training again.

If the beam with the best channel gain, i.e., the best beam, is changed, at step S945, based on the beam training execution result, the terminal and the base station may determine at least one of a transmit power or a data rate for the changed beam with the best channel gain. For example, the terminal and the base station may perform link adaptation at one time on the changed best beam at step S950.

If it is determined at step S955 that there is no data rate available for the best beam as a result of the single execution of link adaptation, beam training may be performed again. For example, at least one of the terminal or the base station may trigger aperiodic beam training.

If a data rate available for the changed best beam is determined at step S960 as a result of the single execution of link adaptation, the terminal and the base station may perform radio communication, at step S935, with the determined data rate using the best beam.

At step S935, the terminal and the base station may measure the error rate. If it is determined at step S940 that the measured error rate is greater the threshold value, the terminal and the base station may perform beam training again.

For example, if the terminal transmits nack signals more than a predetermined number to the base station during a predetermined time period, this may determine that the error rate is greater than the threshold value. As described above, if a beam training period arrives, the terminal and the base station may perform beam training again.

Figure 10:
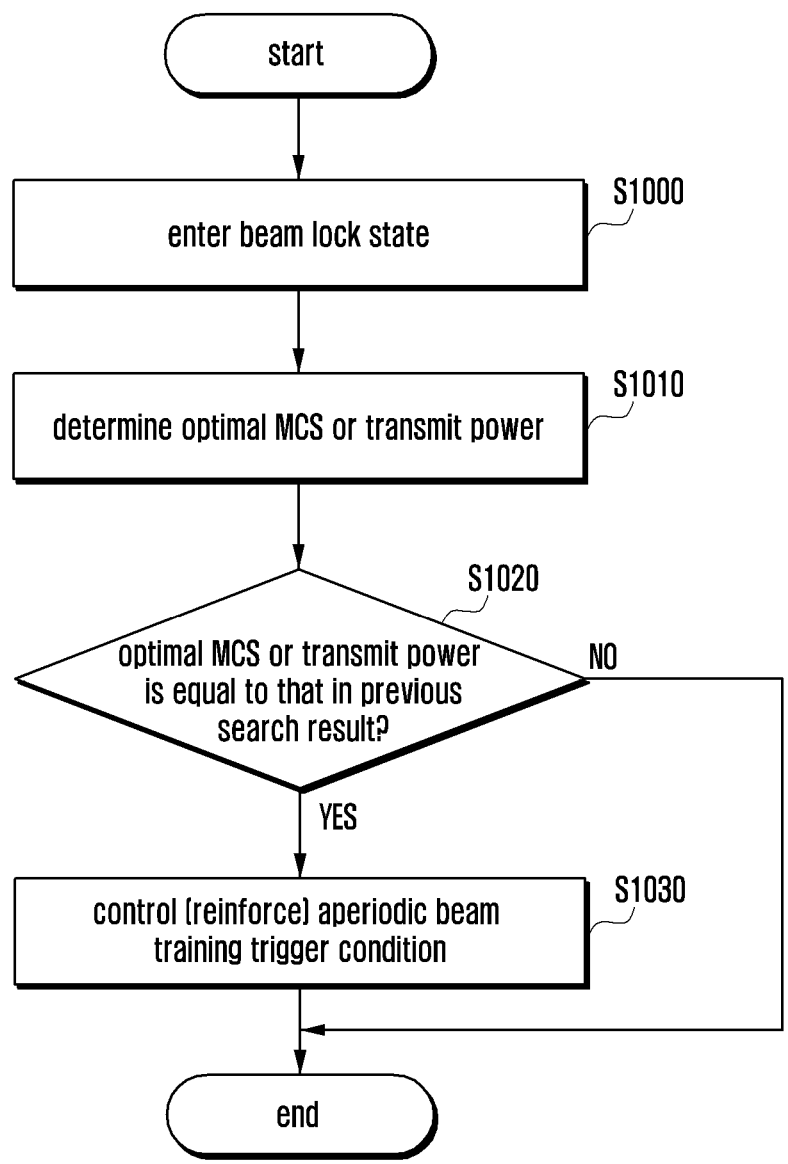
FIG. 10 is a flowchart illustrating a method for controlling beam training-trigger conditions.

FIG. 10 is a flowchart illustrating a method for controlling beam training-trigger conditions. At step S1000, a terminal and a base station may enter a beam lock state. As described above, the beam lock state may mean a state where aperiodic beam training is not triggered by at least one of the terminal or the base station.

At step S1010, the terminal and the base station may determine an optimal MCS or transmit power. For example, if the terminal transmit a CSI-RS report that is triggered by the base station, the base station may determine the optimal MCS based on the received CSI-RS report. It may also be possible for the terminal to determine a transmit power suitable for the best beam.

At step S1020, it may be possible to compare the optimal MCS or transmit power is equal to that of a previous search result. For example, the base station may determine whether the MCS level determined based on the CSI-RS report received from the terminal is maintained with no change in value. The base station or the terminal may also determine whether the transmit power determined based on a TPC is maintained with no change in value.

At step S1030, the terminal and the base station may control aperiodic beam training conditions. For example, at least one of the terminal or the base station may control such that the aperiodic beam training conditions are reinforced.

As described above, the terminal and the base station may control conditions for beam training or link adaptation adaptively according to the channel condition. By refraining from unnecessary execution of beam training or link adaptation, it is possible to avoid any performance degradation caused by unnecessary operations.

Figure 11:
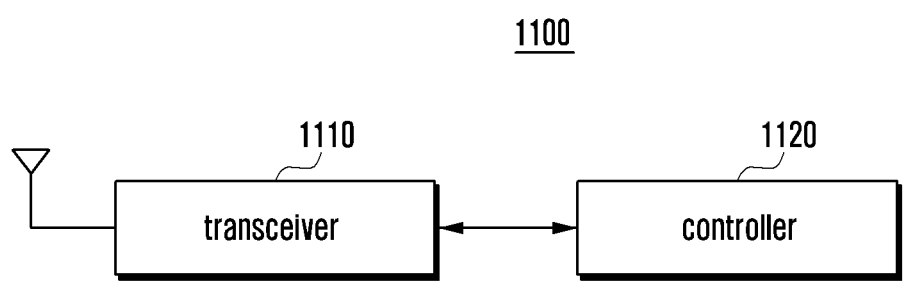
FIG. 11 is a block diagram illustrating a configuration of a terminal according to an embodiment of the disclosure.

FIG. 11 is a block diagram illustrating a configuration of a terminal according to an embodiment of the disclosure.

The terminal 1100 may include a transceiver 1110 and a controller 1120. The transceiver 1110 may be a component for transmitting and receiving signals. For example, the terminal 1100 may transmit and receive to and from a base station by means of the transceiver 1110.

The controller 1120 is a component for controlling overall operations of the terminal 1100. In detail, the controller 1120 may perform beam training and determine whether to suspend triggering the beam training, according to an execution result of the beam training, based on whether a beam with the best channel gain is changed.

If the beam with the best channel gain is not changed, the controller 1120 may control to suspend triggering beam training such that beam training is not performed for the time being.

The controller 1120 may determine at least one of a transmit power or a data rate for the beam with the best channel gain while triggering beam training is suspended.

If at least one of the transmit power or the data rate for the changed beam is determined, the controller 1120 may control the transceiver 1110 to transmit and receive data based on the changed beam and at least one of the transmit power or the data rate until a predetermined event occurs. Here, the predetermined event may be that a predetermined beamforming period arrives or that an error rate becomes greater than a predetermined threshold value.

If at least one of the transmit power or the data rate for the changed beam with the best channel gain is not determined, the controller 1120 may perform beam training again.

If the beam with the best channel gain is changed, the controller 1120 may control to determine at least one of the transmit power or the data rate for the changed beam with the best channel gain at one time. The controller 1120 may also make the determination on at least one of the transmit power or the data rate repetitively until a predetermined event occurs. The predetermined event may be that a predetermined beam training period arrives or that at least one of the transmit power or the data rate is not changed.

Figure 12:
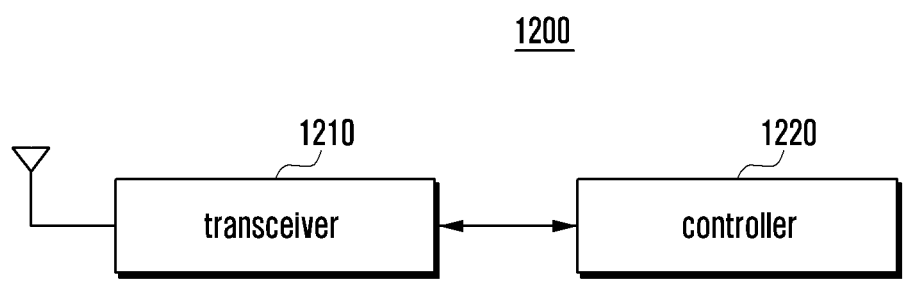
FIG. 12 is a block diagram illustrating a configuration of a base station according to an embodiment of the disclosure.

FIG. 12 is a block diagram illustrating a configuration of a base station according to an embodiment of the disclosure.

The base station 1200 may include a transceiver 1210 and a controller 1220. The transceiver 1210 may be a component for transmitting and receiving signals. For example, the base station 1200 may transmit and receive signals to and from a terminal by means of the transceiver 1110.

The controller 1220 is a component for controlling overall operations of the base station 1200. In detail, the controller 1220 may perform beam training and determine whether to suspend triggering the beam training, according to an execution result of the beam training, based on whether a beam with the best channel gain is changed.

If the beam with the best channel gain is not changed, the controller 1220 may control to suspend triggering beam training such that beam training is not performed for the time being.

The controller 1220 may determine at least one of a transmit power or a data rate for the beam with the best channel gain while triggering beam training is suspended.

If at least one of the transmit power or the data rate for the changed beam is determined, the controller 1220 may control the transceiver 1210 to transmit and receive data based on the changed beam and at least one of the transmit power or the data rate until a predetermined event occurs. Here, the predetermined event may be that a predetermined beamforming period arrives or that an error rate becomes greater than a predetermined threshold value.

If at least one of the transmit power or the data rate for the changed beam with the best channel gain is not determined, the controller 1220 may perform beam training again.

If the beam with the best channel gain is changed, the controller 1220 may control to determine at least one of the transmit power or the data rate for the changed beam with the best channel gain at one time. The controller 1220 may also make the determination on at least one of the transmit power or the data rate repetitively until a predetermined event occurs. The predetermined event may be that a predetermined beam training period arrives or that at least one of the transmit power or the data rate is not changed.

The above-described components of the terminal and the base station may be implemented in software. The controller of the terminal or the base station may include a non-volatile memory such as flash memory. The non-volatile memory may store programs for carrying out the operations of the controller.

The controller of the terminal or the base station may be implemented in the form of including a CPU and a random-access memory (RAM). The CPU of the controller may copy the programs stored in the non-volatile memory to the RAM and execute the copied programs to perform the functions of the terminal or the base station as described above The controller is a component for controlling the terminal or the base station. The term "controller" may be interchangeably used with the same meaning as a central processing device, microprocessor, control unit, processor, and operating system. The controller of the terminal or the base station may be implemented in the form of a single chip (System-on-a-chip, System on chip, SOC, and SoC) along with other functional components such as a transceiver included in the terminal or the base station.

The control methods of the terminal or the base station according to various embodiments of the disclosure may be coded in software and stored in a non-transitory readable medium. The non-transitory readable medium may be used in various devices.

The non-transitory readable medium means a machine-readable medium for storing data semi-persistently rather than a medium for storing data temporarily such as a register, cache, and memory. In detail, the non-transitory readable media may include CD, DVD, hard disc, Bluray disc, USB, memory card, and ROM.

Although preferred embodiments of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the disclosure and such modifications and changes should not be understood individually from the technical spirit or prospect of the disclosure.

The invention claimed is:

1. A control method of a terminal in a wireless communication system, the method comprising:
   determining a first beam for a data communication with a base station, based on a beam sweeping;
   determining a second beam for the data communication with the base station, based on a beam sweeping;
   identifying whether the second beam corresponds to the first beam;
   determining whether a reference signal received power (RSRP) of the second beam is less than a predetermined threshold; and
   in case that the RSRP of the second beam is less than the predetermined threshold, determining whether to perform a beam sweeping, based on the identified result.

2. The method of claim 1, further comprising:
   performing a beam sweeping to determine a beam for the data communication with the base station, based on an arrival of a predetermined period.

3. The method of claim 1, further comprising:
   in case that the second beam does not correspond to the first beam, determining at least one of a transmit power or a data rate for the second beam, and performing the data communication with the base station, based on the second beam and the determined at least one of the transmit power or the data rate.

4. The method of claim 1, further comprising:
in case that the second beam corresponds to the first beam, performing a beam lock to suspend triggering an aperiodic beam sweeping to determine a beam for the data communication with the base station and determining at least one of a transit power or a data rate for the second beam repetitively until a predetermined event occurs.

5. The method of claim 4, wherein the predetermined event is an arrival of a predetermined period or an error rate becoming greater than a predetermined threshold value.

6. A terminal in a wireless communication system, the terminal comprising:
a transceiver; and
a controller configured to:
  determine a first beam for a data communication with a base station, based on a beam sweeping,
  determine a second beam for the data communication with the base station, based on a beam sweeping,
  identify whether the second beam corresponds to the first beam,
  determine whether a reference signal received power (RSRP) of the second beam is less than a predetermined threshold, and
  in case that the RSRP of the second beam is less than the predetermined threshold, determine whether to perform a beam sweeping, based on the identified result.

7. The terminal of claim 6, wherein the controller is configured to perform a beam sweeping to determine a beam for the data communication with the base station, based on an arrival of a predetermined period.

8. The terminal of claim 6, wherein the controller is configured to in case that the second beam does not correspond to the first beam, determine at least one of a transmit power or a data rate for the second beam.

9. The terminal of claim 8, wherein the controller is configured to perform the data communication with the base station, based on the second beam and the determined at least one of the transmit power or the data rate.

10. The terminal of claim 6, wherein the controller is configured to in case that the second beam corresponds to the first beam, perform a beam lock to suspend triggering an aperiodic beam sweeping to determine a beam for the data communication with the base station.

11. The terminal of claim 10, wherein the controller is configured to determine at least one of a transmit power or a data rate for the second beam repetitively until a predetermined event occurs.

12. The terminal of claim 11, wherein the predetermined event is an arrival of a predetermined period or an error rate becoming greater than a predetermined threshold value.

13. A control method of a base station in a wireless communication system, the method comprising:
determining a first beam for a data communication with a terminal, based on a beam sweeping;
determining a second beam for the data communication with the terminal, based on a beam sweeping;
identifying whether the second beam corresponds to the first beam;
determining whether a reference signal received power (RSRP) of the second beam is less than a predetermined threshold; and
in case that the RSRP of the second beam is less than the predetermined threshold, determining whether to perform a beam sweeping, based on the identified result.

14. A base station in a wireless communication system, the base station comprising:
a transceiver; and
a controller configured to:
  determine a first beam for a data communication with a terminal, based on a beam sweeping,
  determine a second beam for the data communication with the terminal, based on a beam sweeping,
  identify whether the second beam corresponds to the first beam,
  determine whether a reference signal received power (RSRP) of the second beam is less than a predetermined threshold, and
  in case that the RSRP of the second beam is less than the predetermined threshold, determine whether to perform a beam sweeping, based on the identified result.

15. The base station of claim 14, wherein the controller is configured to:
in case that the second beam does not correspond to the first beam, determine at least one of a transmit power or a data rate for the second beam, and perform the data communication with the terminal, based on the second beam and the determined at least one of the transmit power or the data rate, and
in case that the second beam corresponds to the first beam, perform a beam lock to suspend triggering an aperiodic beam sweeping to determine a beam for the data communication with the terminal and determine at least one of a transit power or a data rate for the second beam repetitively until a predetermined event occurs.

* * * * *